United States Patent [19]

Hajagos et al.

[11] Patent Number: 5,455,491
[45] Date of Patent: Oct. 3, 1995

[54] POWER SAVING CIRCUITRY

[75] Inventors: Leslie M. Hajagos, Mississauga; Maurice Drieu, Toronto, both of Canada

[73] Assignee: Bailey; Patricia, Mississauga, Canada

[21] Appl. No.: 108,236

[22] Filed: Oct. 14, 1987

[51] Int. Cl.$^6$ .................................................. H05B 37/02
[52] U.S. Cl. .................. 315/291; 315/208; 315/224; 315/158; 315/194; 323/223; 323/235; 323/320
[58] Field of Search ................................ 315/224, 158, 315/194, 199, 291, 309, DIG. 4, 208; 323/205, 223, 224, 235, 320, 324

[56] References Cited

U.S. PATENT DOCUMENTS

| | | | |
|---|---|---|---|
| 4,082,981 | 4/1978 | Morton et al. | 315/309 |
| 4,099,099 | 7/1978 | Grudelbach | 315/194 |
| 4,287,455 | 9/1981 | Drieu | 315/199 |
| 4,350,935 | 9/1982 | Spira et al. | 315/208 X |
| 4,482,844 | 11/1984 | Schweer et al. | 315/291 X |
| 4,528,482 | 7/1985 | Merlo | 315/281 |
| 4,544,863 | 10/1985 | Hashimoto | 315/224 |
| 4,567,425 | 1/1986 | Bloomer | 323/235 X |
| 4,633,161 | 12/1986 | Callahan et al. | 315/194 X |

*Primary Examiner*—Robert J. Pascal
*Assistant Examiner*—Michael B. Shingleton
*Attorney, Agent, or Firm*—Barrigar & Moss

[57] ABSTRACT

Power saving circuitry is provided for use with fluorescent lights, inductive loads and resistive loads. The circuitry comprises a power circuit connectable to an alternating circuit power supply and a control circuit. The power circuit includes a bilateral switch, and the control circuit includes means for timing the operation of the bilateral switch so that the switch conducts current for a predetermined time during each half-cycle of the power supply which terminates at a predetermined interval before the end of each half cycle. A preferred embodiment of the power saving circuitry, adapted for use with fluorescent lights or inductive loads such as electrical motors, also comprises a Back-EMF suppressor circuit. The bilateral switches are preferably made up of one or more unilateral switch devices such as field effect transistors. The subject circuitry reduces power consumption while at the same time providing for a power factor correction.

5 Claims, 8 Drawing Sheets

POWER SAVING CIRCUITRY

FIELD OF THE INVENTION

This invention relates to power saving circuits for use with fluorescent lights, inductive loads such as electric motors, and resistive loads such as incandescent lights and electric heaters.

BACKGROUND OF THE INVENTION

As energy costs increase and the use of electric lighting, heating and motors expands, more and more attention is being given to the design of efficient electrical systems. SCR (Silicon Controlled Rectifier) and Triac-based AC (alternating current) voltage controllers have long been in use for controlling resistive loads (i.e. loads in which there is no phase difference between the voltage and current). There are also systems which have been proposed for controlling the AC power supply to fluorescent lights. For example, U.S. Pat. No. 4,287,455 (Drieu) issued on 1 Sep., 1981, discloses a control circuit which supplies current to one or more gaseous discharge lamps during an adjustable final portion of each half-cycle of the AC power supply. However, since this circuitry allows current to pass through the load only during the final portion of each half-cycle of the AC power supply, an inductive effect is produced, i.e. a time lag is created between the peak line voltage and the peak line current.

This inductive effect affects the power factor, i.e. the ratio of the power actually used by the load to the power supplied by the line, where the power is the integral of V·I·dt. In the case of a simple sinusoidal line voltage signal, the power factor may be expressed as:

$$\frac{V \cdot I \cos \theta}{VI},$$

where V and I are the voltage and current supplied by the line, and θ is the phase angle between the line voltage and the load current. When the line voltage and the load current are in phase, as is the case with a resistive load, cos θ=1, resulting in a unity power factor. But in the case of an inductive load, or a circuit which produces an inductive effect, such as a fluorescent lamp circuit, the line voltage and load current are out of phase, so cos θ<1, resulting in a power factor having a value less than unity. Since utility companies generally charge commercial users a higher rate if the power factor falls below a particular value (e.g. 0.90), the reduction in power consumption occasioned by the use of prior art power saving circuits may in some cases be offset by the higher rate charged by the utility company.

BRIEF SUMMARY OF THE INVENTION

The present invention provides an improved power saving circuit for reducing the electrical consumption of fluorescent and incandescent lights, electrical furnaces, induction motors, and other resistive and inductive loads, while at the same time accomplishing a power factor correction. The power saving circuitry of the present invention is particularly advantageous for commercial users having a number of inductive loads, such as pumps, air conditioners, grinders, fans, induction furnaces, and welders, on the same supply, because it allows for the selection of a capacitive power factor (i.e. wherein the current leads the voltage) which tends to cancel out part of the inductive effect caused by the inductive loads on the same supply, thereby raising the overall power factor closer to unity.

The present invention provides power saving circuitry for reducing the current supplied to a load, comprising a power circuit connectable to an alternating current power supply and to the load, the power circuit including bilateral switch means for selectively conducting current of positive and negative polarity, and a control circuit including timing means for timing the operation of the bilateral switch means so that the switch means conducts current for a predetermined time during each half-cycle of the power supply, the predetermined time terminating at a predetermined interval before the end of the half-cycle. This power saving circuit causes the current to flow through the bilateral switch means preferably only during an initial part of each half-cycle of the AC power supply. This produces a capacitive effect, which is not, however, disadvantageous if, for example, the power saving circuit is utilized in conjunction with inductive loads or with a circuit which produces an inductive effect, such as the circuit described in the above-mentioned U.S. Pat. No. 4,287,455, so as to achieve an overall power factor very close to unity.

The timing means of the power saving circuitry of the present invention may be operable to cause the switch means to conduct current from the power supply to the load for a pre-determined time during each half-cycle which commences either at the beginning of each half-cycle, or at a predetermined interval after the beginning of the half cycle. Thus, in the latter case, current may be caused to flow through the bilateral switch means only during a middle portion of each half-cycle of the AC power supply, thereby achieving a unity power factor independent of the type of load.

In a preferred embodiment of the invention adapted for use with fluorescent lights which create an inductive effect and other inductive loads in which energy is stored in the loads, the power saving circuit also comprises suppressor means actuated following the end of the predetermined time during which the switch means is conducting, for suppressing any reverse voltage pulses caused by the cessation of current flow through the load. This suppressor means prevents the bilateral switching means from being damaged, by dissipating the reverse voltage pulse in the load. The suppressor means may comprise bilateral switch means actuated a predetermined time after a drop in load voltage.

BRIEF DESCRIPTION OF THE DRAWINGS

The present invention is described herein, by way of example only, with reference to the accompanying drawings, in which like reference numeral s refer to like components throughout, wherein.

DETAILED DESCRIPTION OF THE PREFERRED EMBODIMENTS

Figure 1:
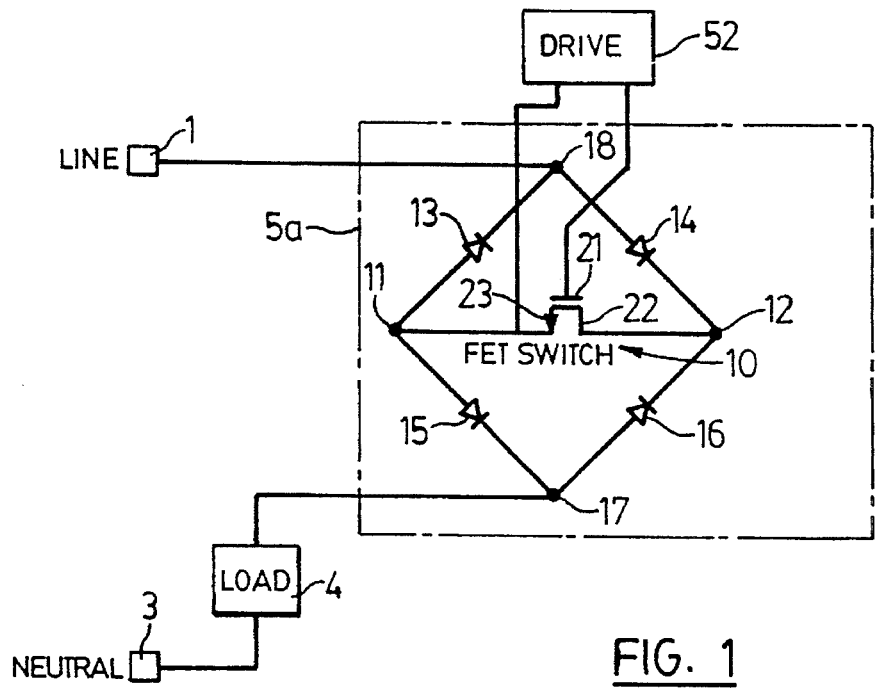
FIG. 1 is a circuit diagram for a preferred embodiment of the bilateral switch means of the power saving circuit of the present invention.
Figure 2:
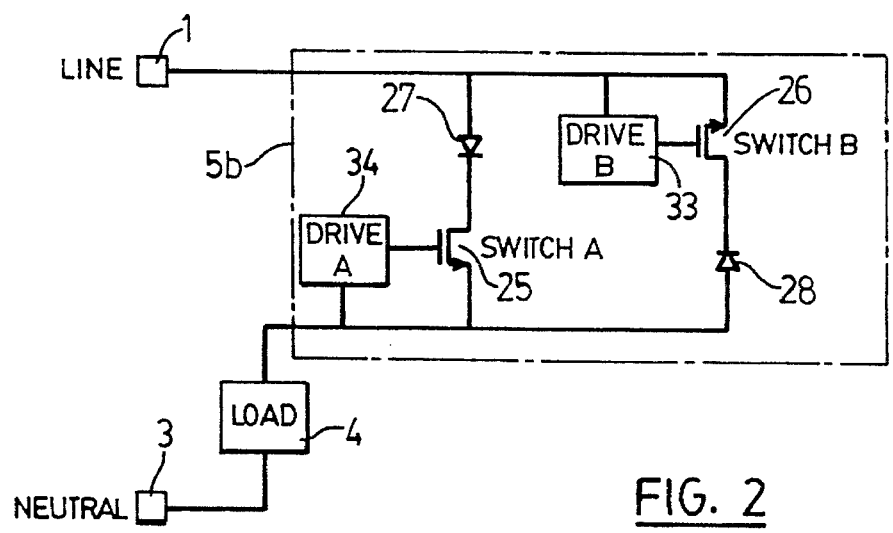
FIG. 2 is a circuit diagram for an alternative embodiment of the bilateral switch means of the present invention.
Figure 3:
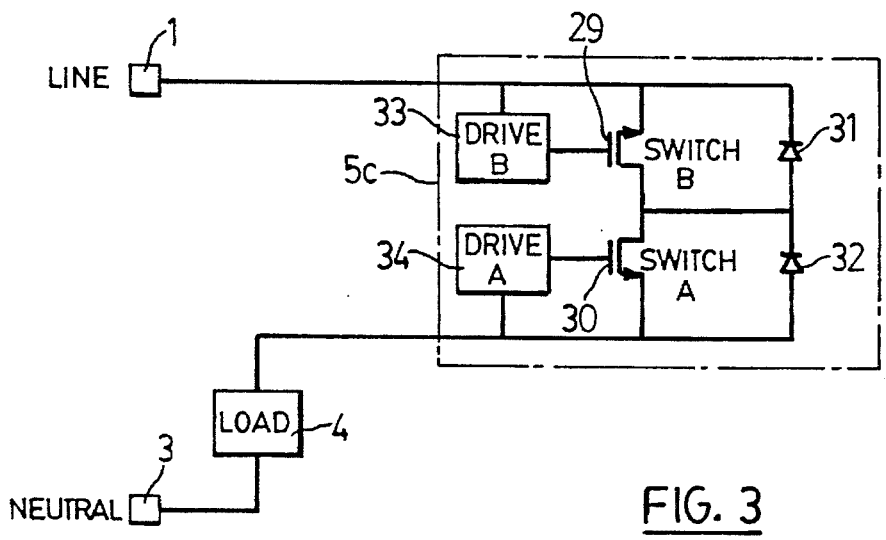
FIG. 3 is a circuit diagram for a further alternative embodiment of the bilateral switch means of the present invention.

The power saving circuitry of the present invention comprises bilateral switch means for switching on and off the current from an AC power supply to the load during both the positive and negative half-cycles of the AC cycle. This switch means is referred to as being "bilateral" because it is capable of conducting and switching current of either polarity, unlike a "unilateral" switch, which can conduct current of only one prespecified polarity. FIGS. 1–3 show three different ways of configuring a bilateral switch from unilateral current conducting components.

As shown in FIG. 1, bilateral switch 5a may comprise a FET (Field Effect Transistor) device 10 connected to the DC (Direct Current) terminals 11 and 12 of a rectifier bridge circuit comprising diodes 13, 14, 15 and 16. Line terminal 1 is connected to the AC (Alternating Current) terminal 18 of the rectifier bridge, and load 4 is connected to the AC terminal 17 of the bridge. When a drive signal is applied to gate 21 of FET device 10, the resistance between the drain 22 and collector 23 of FET device 10 drops to almost zero, shorting the bridge and allowing current to flow through FET device 10 from DC terminal 12 to DC terminal 11. The gate 21 of the FET device 10 is controlled by main drive 52, the operation of which is described in more detail with reference to FIG. 4.

In operation, during the positive half-cycle of the AC power supply, when FET device 10 is conducting, current flows from line terminal 1, through diode 14, FET 10 and a diode 15, through load 4, to the neutral terminal 3. Similarly, during the negative half-cycle of the AC power supply, current flows from the neutral terminal 3, through the load 4, diode 16, FET device 10, and diode 13, back to line terminal 1, when a drive signal is present at gate 21 of FET 10. When this gate voltage is removed during either half-cycle of the power supply, the resistance of FET device 10 returns to a high value, preventing further flow of current through FET 10, causing bilateral switch means 5a to stop conducting current.

FET device 10 may be a single MOSFET (Metal Oxide Semiconductor Field Effect Transistor) device, or two or more of such devices connected in parallel, depending upon the current handling requirements. FET devices are particularly well adapted for use with the present invention, because: (1) a FET will stop conducting when the gate signal is removed, unlike some semiconductive switch devices; (2) a FET has high current handling capability; (3) a FET has a negative temperature coefficient (that is, it draws less current when it heats up, so non-identical FETs can be used in parallel); and (4) a FET does not require a high power drive circuit. However, it will be appreciated that transistor devices other than FETs could be used to configure the bilateral switch means of the present invention, provided that the devices are operable to cause the instantaneous current flowing therethrough to cease upon receiving a timing signal. SCR (Silicon Controlled Rectifier) devices cannot be used, because they cannot be switched off while current is still flowing. Bipolar transistors can be switched off while the current is still flowing, but typically bipolar transistors cannot handle high power loads, without a prohibitively high power drive. Moreover, bipolar transistors typically have a positive temperature coefficient, which leads to thermal instability when they are connected in parallel, unless they have identical characteristics. GTO (Gate Turn-Off SCR) devices can be turned off if a pulse is applied to the gate to overwhelm the current, but GTO devices require high power control circuitry, which increases the energy consumption of the power saving circuit. The field effect transistor is accordingly the commercially preferred embodiment of the class of suitable such devices.

An alternative embodiment of the bilateral switch means of the present invention, utilizing two unilateral FET devices, is shown in FIG. 2. Bilateral switch 5b comprises FET devices 25, 26, protected by external diodes 27, 28, connected in an opposite parallel configuration. During the positive half-cycle of the AC supply, the current flows from the line 1, through diode 27 and FET 25, to load 4, when the gate of FET device 25 is driven. Likewise, the gate of FET 26 is driven during the negative half-cycle, causing a current flow from the neutral 3, through the load 4, diode 28, and FET 26.

Referring now to FIG. 3, there is disclosed therein a further alternative embodiment of the bilateral switch means of the present invention, namely bilateral switch 5c, which comprises two FET devices 29, 30, connected in series. FET devices 29, 30 are each capable of conducting a current from source to drain without actuation of their gates, when they are reverse-biased; in other words, FET devices 29, 30 have internal diodes 31, 32, respectively. In operation, current flows from line 1 through the internal diode 31 of FET device 29 and then through FET 30 from drain to source when the gate of FET 30 is activated by DRIVE A circuit 34 during each positive half-cycle of the AC signal. During each negative half-cycle, current flows from neutral 3 through load 4 through internal diode 32 of FET device 30 and through FET device 29, when DRIVE B circuit 33 activates the gate gate of FET device 29.

Figure 4:
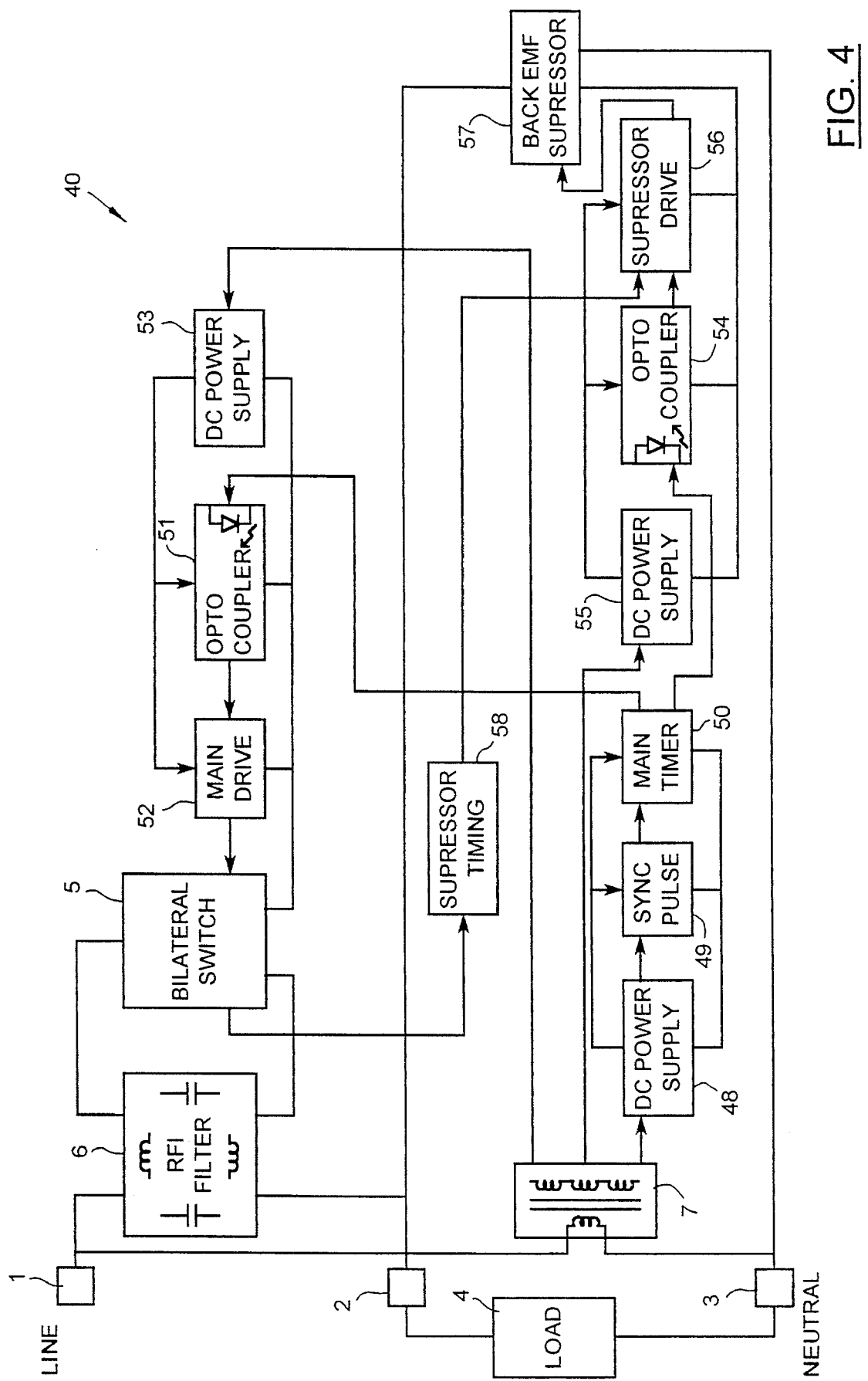
FIG. 4 is a block diagram for the preferred embodiment of the power saving circuitry of the present invention.

Referring now to FIG. 4, there is illustrated therein in block diagram form power saving circuitry 40 for reducing the current supplied to a load 4, which may be a fluorescent lamp assembly comprising a number of separate fluorescent lamp fixtures, with each lamp fixture including a conventional ballast circuit. Power saving circuitry 40 comprises a power circuit having Bilateral Switch 5, which preferably takes the form of bilateral switch means 5a described with reference to FIG. 1 above, connected in series between the line terminal 1 of an AC power supply and the load terminal 2, load 4 being connected in the usual way to the neutral terminal 3 of the AC power supply. Bilateral Switch 5 has one terminal connected to the line terminal 1 and its other terminal connected to the load terminal 2. A filter 6 to suppress radio frequency interference may be inserted in series with each of the line and load terminals 1, 2. Bilateral Switch means 5 is controlled by a control circuit described below, having the voltage wave forms shown in FIG. 5.

The control circuit is powered by a multi-secondary transformer 7 which is driven from line terminal 1 and neutral terminal 2. Each secondary voltage of transformer 7 is rectified and regulated by regulators 48, 53 and 55, to provide floating DC supplies for the control circuitry.

Figure 5:
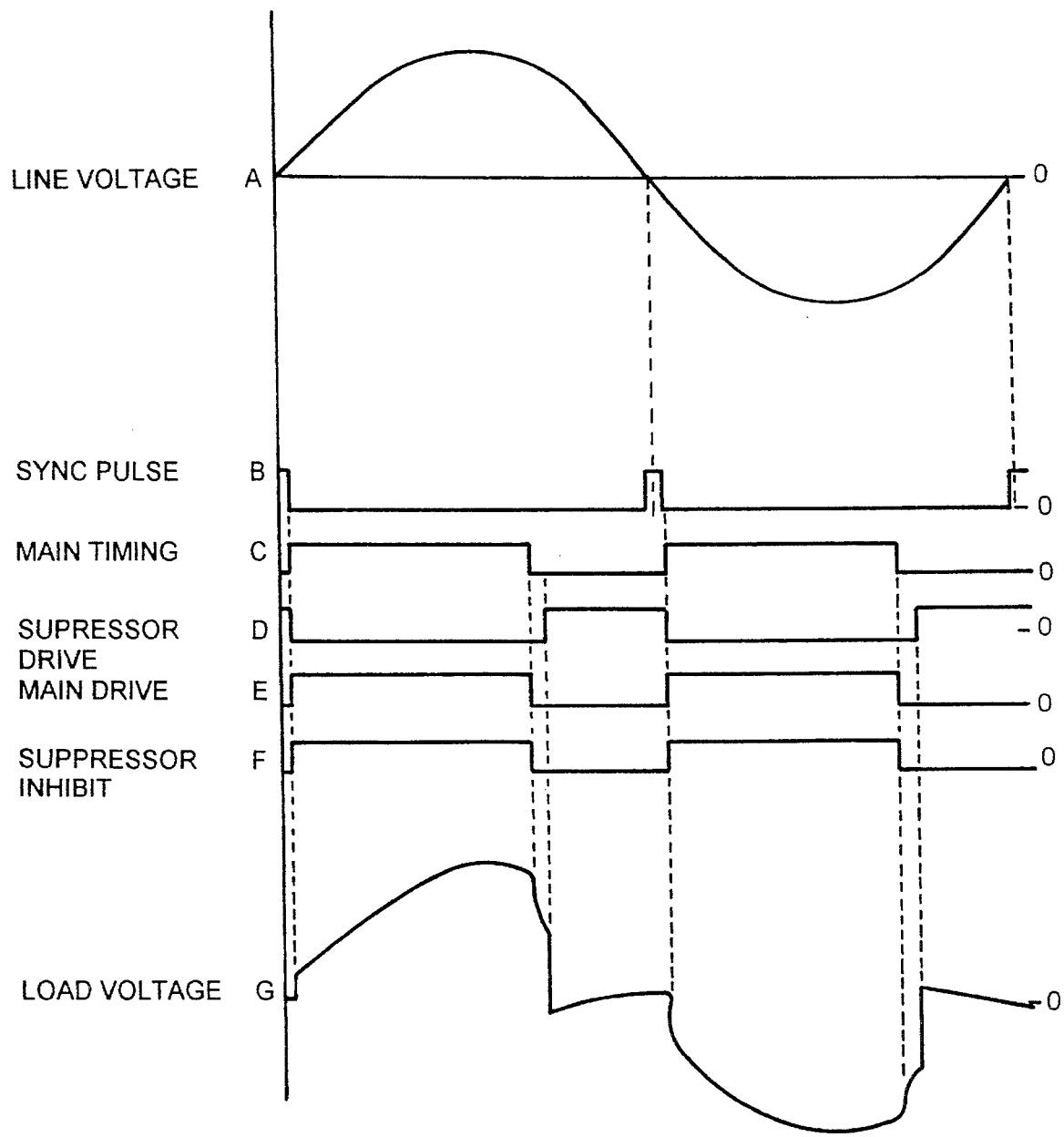
FIG. 5 shows the voltage wave forms generated by the circuitry shown in FIG. 4.

A zero-crossing detector Sync Pulse circuit 49 produces synchronizing pulse SYNC B in phase with the AC mains A each half-cycle as shown in FIG. 5. This pulse triggers the Main Timer 50 which produces a square-wave pulse C of adjustable pre-determined duration, which is conducted by Opto-coupler 51 to the Main Drive 52. Main Drive 52 drives the gate of the FET device of Bilateral Switch 5 with a square-wave pulse E identical to main pulse C as shown in FIG. 5, causing the Bilateral Switch 5 to conduct current to the load during a predetermined initial portion of each half-cycle of the AC mains. The resulting load voltage G is shown in FIG. 5. Although this causes a capacitive power factor, this effect may be used to compensate for the inductive power factor found in most commercial installations.

When the drive signal E from the Main Drive circuit 52 terminates, Bilateral Switch 5 ceases conducting, and the voltage across load 4 drops rapidly. If allowed to continue unabated in the case of an inductive load, the voltage would drop to a negative potential sufficient to damage the active devices in the circuitry. This effect is known as the Back-EMF (Electromotive Force) produced when current is suddenly interrupted in an inductive load. To prevent this Back-EMF, or high momentary reverse voltage, from appearing across load 4 at the point in each half-cycle when the Bilateral Switch 5 ceases conducting as a result of the termination of the drive signal from Main Drive 52, the power saving circuitry 40 includes a Back-EMF Suppressor 57 which dissipates the switch-off energy into the load, where it adds to the efficiency of the entire circuit. Back-EMF Suppressor 57 acts like an "active" fly back diode which suppresses transient voltages which occur as a result of switching off of current through an inductive load.

Back-EMF Suppressor 57 preferably comprises a bilateral switch like that shown in FIG. 1. Suppressor Timing circuit 58 detects the onset of switch-off and triggers Suppressor Drive 56, which in turn applies a driving pulse D to the gate of the FET device of Back-EMF Suppressor 57. This causes the FET device of Back-EMF Suppressor 57 to conduct until the initiation of the next main timing pulse C, thereby dissipating the energy caused by switching off Bilateral Switch 5, through the load 4. In other words, the circuit 57 functions as a load energy return circuit that returns load energy to the load immediately following the opening of bilateral switch 5. As a result, the overall efficiency of the circuit is increased, by utilizing the energy stored in the load to produce useful work.

Main pulse C from Main Timer 50 is also connected to the light-emitting part of Opto-coupler 54, which produces another pulse F identical to pulse C which disables Suppressor Drive 56, so that when Bilateral Switch 5 is conducting, Back-EMF Suppressor 57 is disabled. This prevents spurious noise signals from activating Back-EMF Suppressor 57. During the interval when main pulse C is not active, Opto-coupler 54 is not active and Suppressor Drive 56 is enabled to accept a trigger pulse.

It will be appreciated that the power saving circuitry of the present invention need not include Back-EMF Suppressor 57 and its related circuitry if the power saving circuit is used merely to control the power output to resistive loads such as incandescent lights connected to an AC source, because there is no energy stored therein, unlike inductive loads.

The power output of power saving circuitry 40 is proportional to the duration of pulse C from Main Timer 50, which is adjustable over a wide range. Depending upon the load used, the power output can be adjustable from almost 0% to almost 100% of full power. In one embodiment, the duration of main pulse C is controlled by a potentiometer, which may be external to the circuit, to allow for manual adjustment of the power level delivered to the load. Alternatively, the use of a photosensitive resistor or thermally sensitive resistor in place of the external potentiometer would allow the power delivered to the load to be determined by light level or temperature. This would enable automatic or feedback control of the output of the load. For example, the photosensitive resistor could be made operable to react to the ambient or outside light levels, thereby increasing the power output level if the ambient light fell below a certain level. Similarly, it would be possible to provide for light level feedback to achieve a constant illumination level, with the addition of a suitable light detector and associated feedback circuitry.

Figure 6:
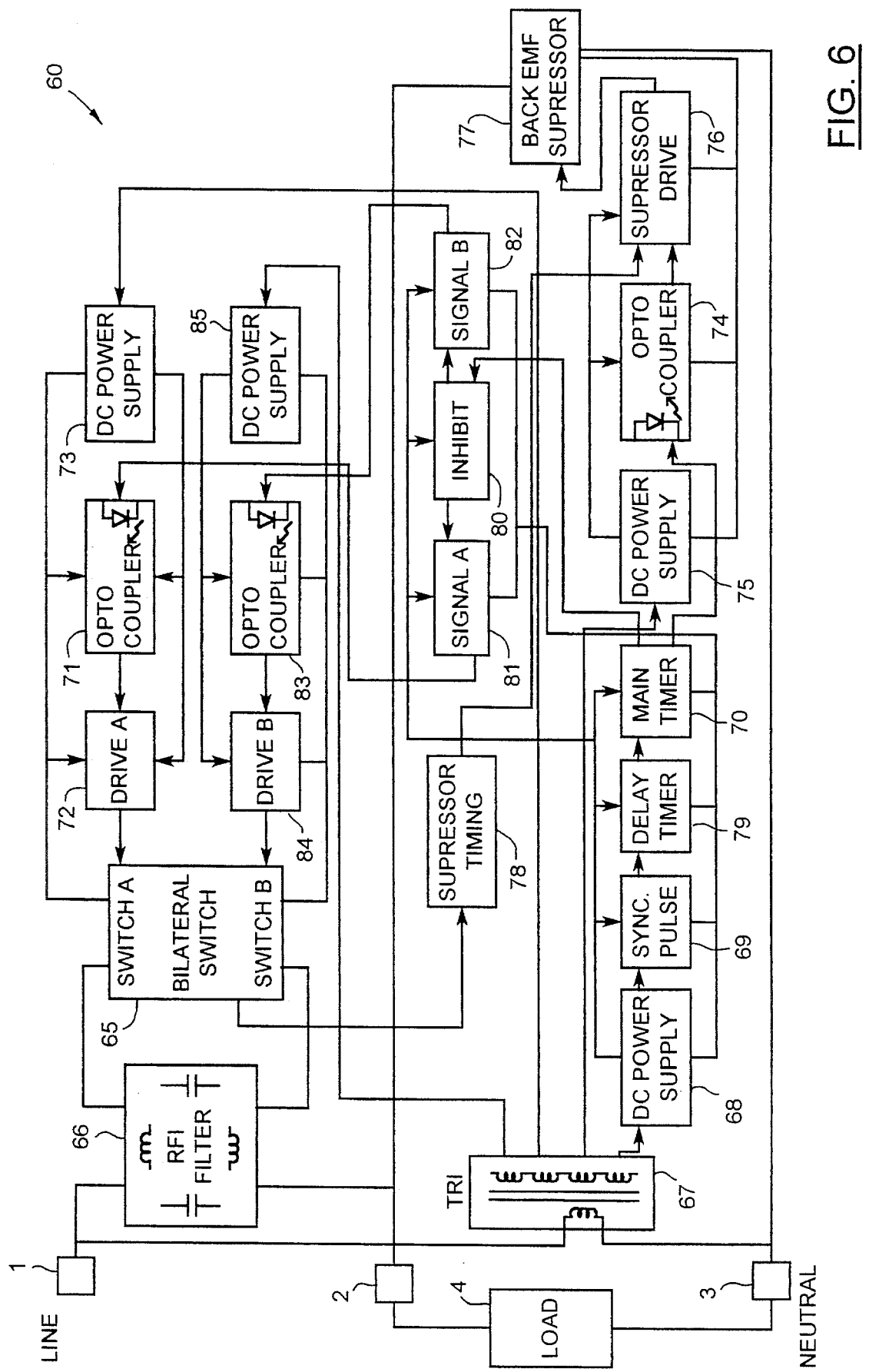
FIG. 6 is a block diagram for an alternative embodiment of the power saving curcuitry of the present invention, wherein current is conducted to the load only during a medial portion of each half-cycle of the AC power supply wave form.
Figure 7:
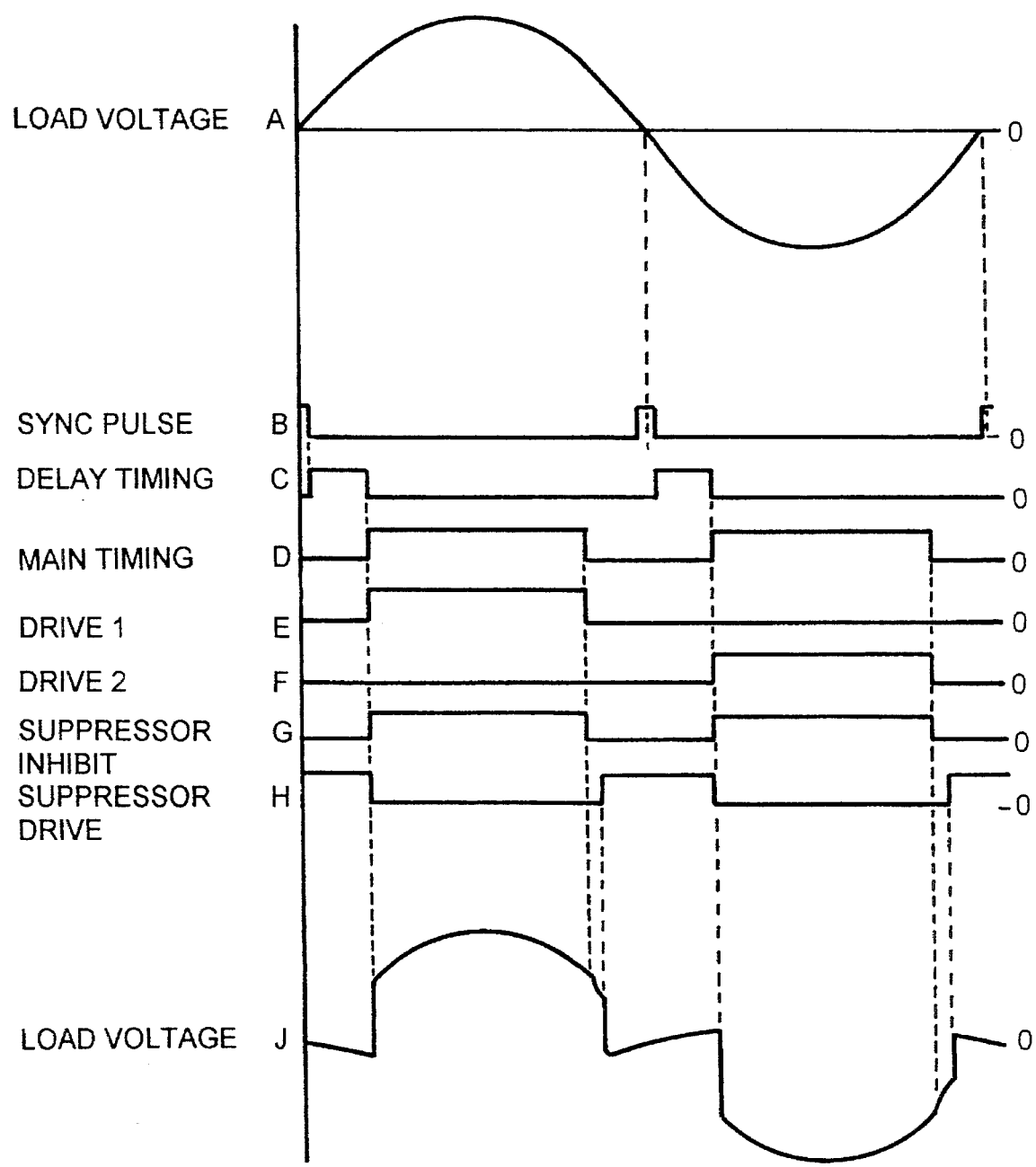
FIG. 7 shows the voltage wave forms of the circuitry shown in FIG. 6.

Referring now to FIGS. 6 and 7, there is disclosed therein an alternative power saving circuit operable to place the load current in the middle of each half-cycle of the AC power supply, so as to result in a unity power factor. This alternative embodiment of the power saving circuitry of the present invention is operable to cause the bilateral switch means to not start conducting current until after a predetermined interval following the beginning of each alternate half-cycle.

Alternative power saving circuitry 60 is configured to include Bilateral Switch 65 in the form of the bilateral switch means shown in FIG. 2 or FIG. 3 comprising two unilateral switches A and B, together with their associated drive circuits, designed 72 and 84 respectively in FIG. 6. These drive circuits correspond respectively to drive circuits 34, 33 of FIG. 2 or 3. Because Bilateral Switch 65 includes two discrete switches, circuitry 60 must include two drive circuits, one to drive each of the two switches. However, it should be appreciated that the Bilateral Switch 5a (FIG. 1), using only one FET device, could as well be used as the Bilateral Switch 65, in which case only one drive circuit (designated 52 in FIG. 1) would be necessary.

The control circuit of power saving circuitry 60 includes a multi-secondary transformer 67, with primary connected across AC terminals 1 and 3, and a number of secondaries connected to rectifiers and DC regulators to form DC power supplies 68, 73, 75 and 85. Zero-crossing Detector 69 produces a sync pulse B in phase with the AC mains A each half-cycle as shown in FIG. 7. This pulse triggers Delay Timer 79 to produce a square-wave pulse C of adjustable duration, which in turn triggers Main Timer 70. Both Main Timer 70 and Delay Timer 79 are adjustable by means of a single potentiometer in their timing networks. The potentiometer is connected in such a way that the square-wave pulse D lasts for an equal amount of time both before and after the maximum voltage point of each half-cycle of the AC power supply. By altering the potentiometer of Main Timer 70, the length of the square wave pulse D as a proportion of the half-cycle time can be varied, with the midpoint of pulse D always being at the midpoint of the length of the half-cycle.

The square-wave main pulse D of Main Timer 70 is conducted by Opto-coupler 74 to disable the operation of Back-EMF Suppressor 77 during the duration thereof, and as well, is conducted to Inhibit circuit 80, which inhibits either Drive A circuit 72 or Drive B circuit 84, depending upon the polarity of the AC mains A. During the half-cycle when the instantaneous value of the AC mains voltage is positive with respect to the source of Switch A (which may be either FET device 25 shown in FIG. 2 or FET device 30 shown in FIG. 3), the main pulse D is conducted to Signal A circuit 81, which in turn relays the main pulse D to Drive A circuit 72, via Opto-coupler 71. Meanwhile, Signal B circuit 82 is disabled, by Inhibit circuit 80. Drive A circuit 72 produces a square-wave pulse E identical to main pulse D, which it feeds via a resistor to the gate of Switch A, causing Switch A to conduct current to the load during the predetermined interval when the main pulse is present.

Therefore, in operation, during the half-cycle of the AC power supply when Switch A is being driven by Drive A circuit 72, Switch A conducts for the predetermined time during which the driving signal exists. This driving signal starts a predetermined interval after the beginning of the half-cycle and ends an equal predetermined interval before the end of the half-cycle, so the conducting time is symmetrical with respect to the middle of the half cycle.

The operation of Signal B circuit 82 is similar to that of Signal A circuit 81, except that Signal B circuit 82 operates during each alternate half-cycle of the AC mains. When actuated, Signal B circuit 82 sends a signal the same duration as square-wave signal D from Timer 70 to the light emitting diode of Opto-coupler 83. The light-sensitive element of Opto-coupler 83 in turn conducts the square-wave signal to Drive B circuit 84, which produces a square-wave signal F at its output terminal which is applied to the gate of Switch B (which is either FET device 26 if the circuit of FIG. 2 is being used, or FET device 29 if the circuit of FIG. 3 is being used). Therefore, Switch B conducts for the predetermined time during each half-cycle during which the gate of Switch B is supplied with drive signal F. Current therefore passes through Switch B and load 4 for such predetermined time during each alternate half-cycle.

The resulting load voltage J is shown in FIG. 7. Since the AC power supply current passes through the load for an adjustable middle portion of each half-cycle, by operation of power saving circuitry 60, the voltage and current are in phase, so there is no resulting reduction of power factor.

Back-EMF Suppressor 77 functions like previously described Back-EMF Suppressor 57, to prevent a high momentary reverse voltage from appearing across load 4 at the point in each half-cycle when either Switch A or Switch B ceases conducting, in the case of inductive loads.

Zero crossing Detector 69 preferably includes a brief delay at start-up, e.g. 1 or 2 seconds, before producing sync pulses B, thereby allowing voltage in other parts of the circuit to stabilize before application of a drive signal to Bilateral Switch 65. This delay is achieved by a timing capacitor, which is discharged quickly when the AC power is interrupted, so that the delay is obtained even after brief power failure or a quick manual turn-off and turn-on period.

Main Timer 70 may also include a sensing means to detect the voltage level of the AC mains and to alter its output in such a fashion as to compensate for fluctuations in the AC mains voltage level. This insures a constant power to the load at the same setting of the Main Timer 70 chosen prior to the fluctuation of the AC mains.

Figure 8A:
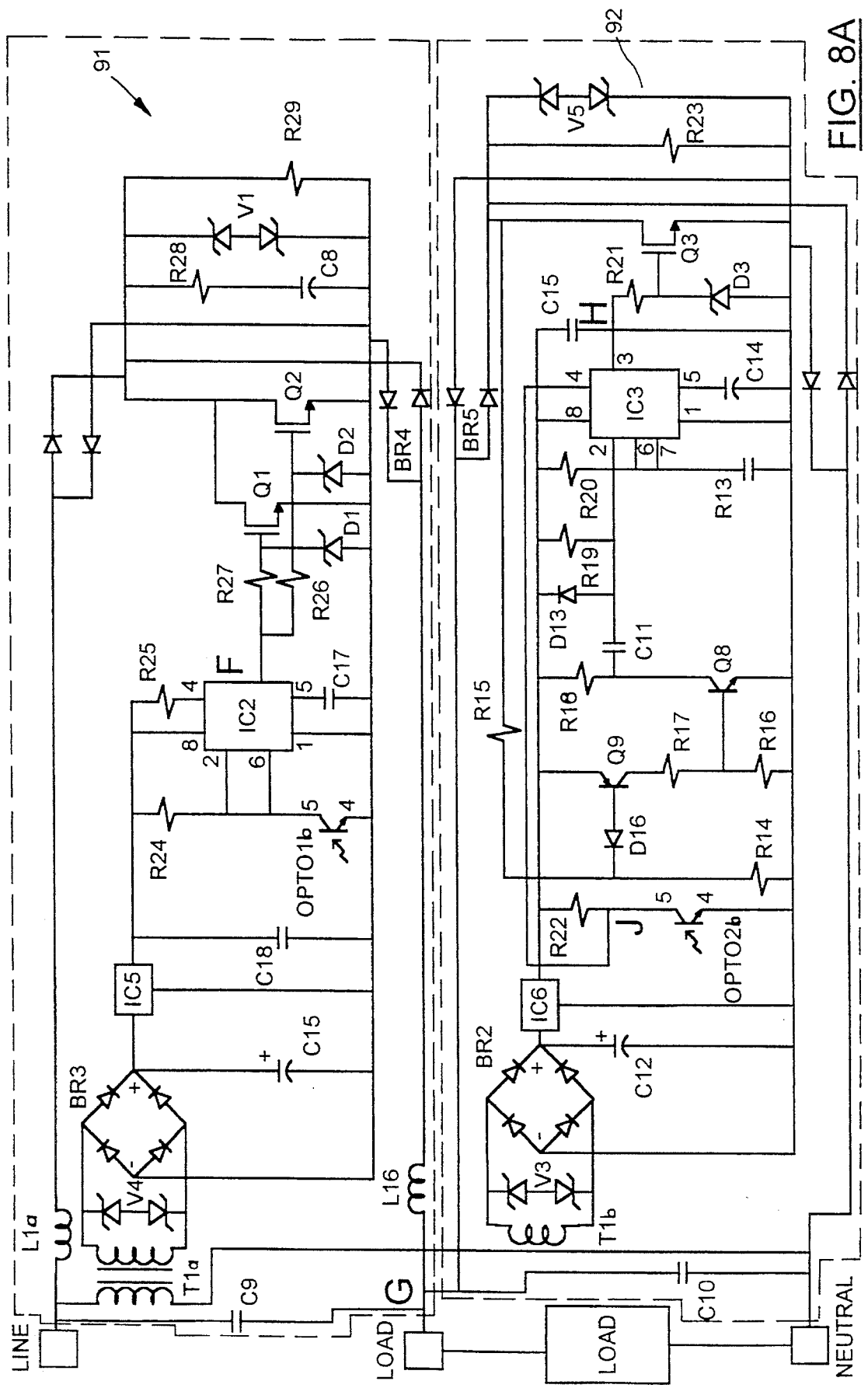
FIGS. 8a and 8b are schematic diagrams for the preferred embodiment of the power saving circuitry of the present invention.
Figure 8B:
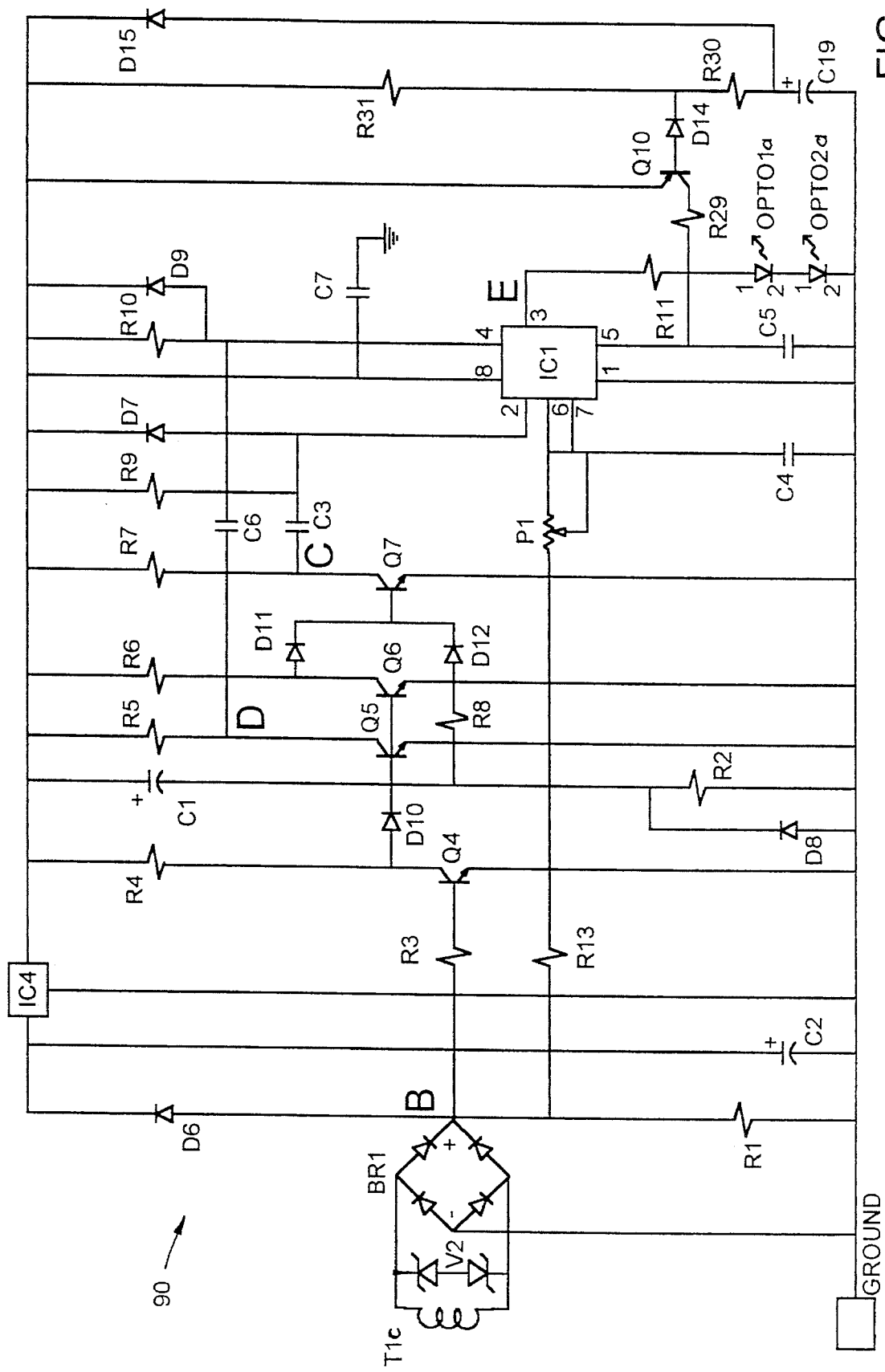

FIGS. 8a and 8b are schematic diagrams of the circuitry for the preferred embodiment of the power saving circuitry of the present invention. This particular embodiment is operable to conduct current from the power supply to the load for a predetermined time terminating at a predetermined interval before the end of each alternate half-cycle. However, it can be easily adapted to conduct current during a middle portion of each half-cycle by inclusion of a delay timer as shown in FIG. 6.

Figure 9:
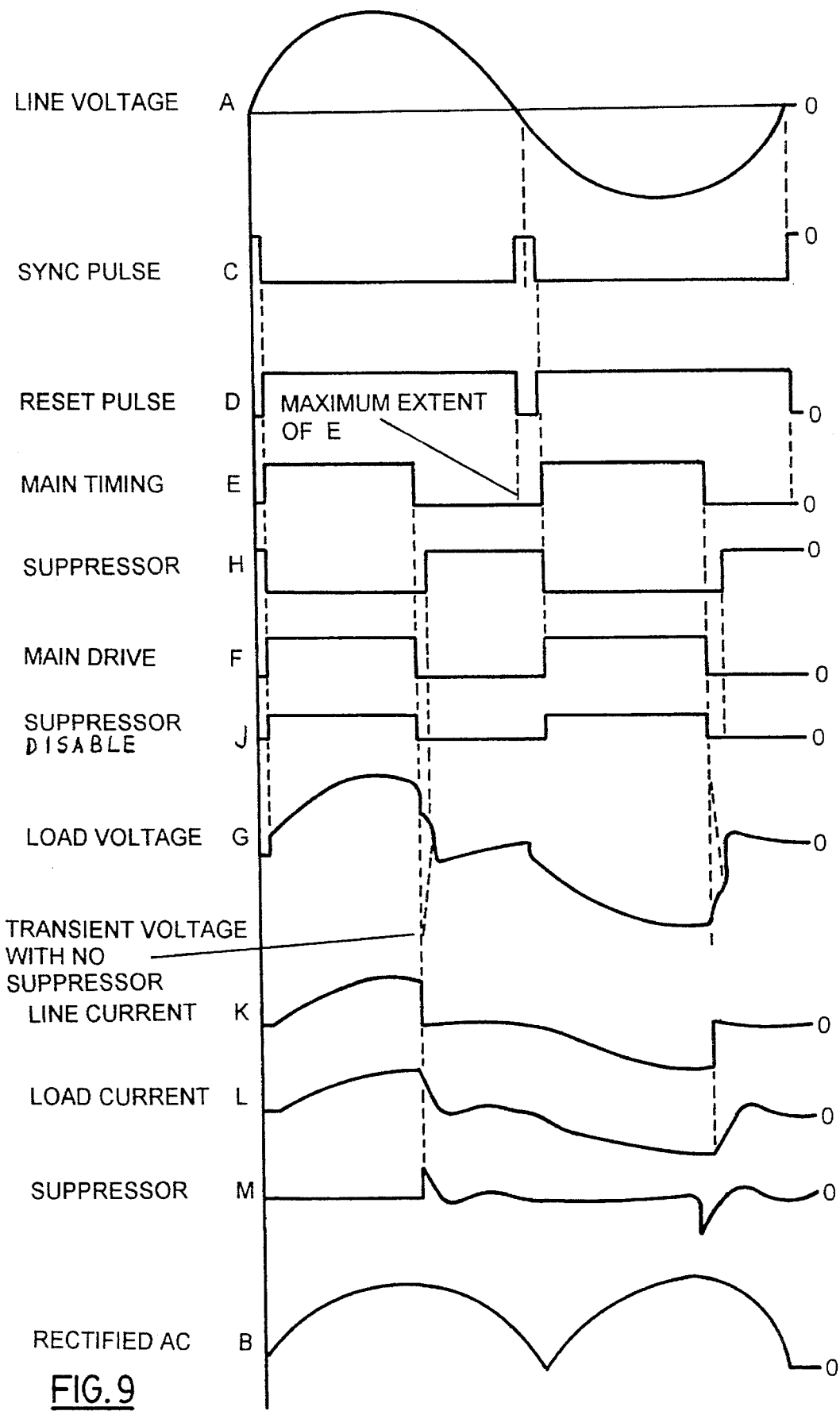
FIG. 9 demonstrates the wave forms of the circuits shown in FIGS. 8a and 8b.

Referring first to FIG. 8b, there is shown therein timing control circuitry 90 which generates the timing signal to operate the power devices used in the high voltage circuits shown in FIG. 8a. Transformer T1 has a primary side connected between the line and neutral of the AC power source. It has three secondaries, T1a, T1b and T1c, which are all 12 v 60 Hz AC sources, as indicated in FIG. 8a. T1c, together with transient suppressor V2, bridge rectifier BR1, diode D6, capacitor C2, and voltage regulator IC4, form a 12 v DC power supply for the control circuitry 90. Diode D6 isolates the power supply capacitor C2 from the rectified AC waveform B of FIG. 9 which appears across R1.

Transistors Q4, Q6, and Q7, diodes D10 and D11, resistors R1, R3, R6, R7 and R14 form a pulse generator which produces a synchronizing pulse SYNC C, at each zero-crossing of the AC power line A. The negative going edge of this pulse is derived by a network formed by C3, R9 and D7, and used to trigger the Main Timer IC1.

At turn-on of the power, capacitor C1 is discharged, so it inhibits the operation of the pulse generator through R8, D12 and Q7, with the result that no timing signals are generated for the first few seconds of the application of power to the switching devices. This ensures that the circuit begins operation under controlled conditions at the first zero-crossing of the AC power after the time delay of one to two seconds. Capacitor C1 charges through R2 and becomes inactive after the time delay unless there is some interruption of the AC power. If the interruption is less than one cycle, the circuit continues to function normally with no interruption of the control signals, but if the interruption is longer than one cycle, the regulated power supply drops to almost zero and capacitor C1 discharges through diode D8 in less than one cycle. When the power is restored, the circuit functions as before with a brief start-up delay to ensure proper timing. This circuit helps to ensure stable performance under fluctuating power conditions (i.e. a lightning storm or electrical failure on an adjacent service).

Main Timer IC1 produces a signal MAIN E, synchronized to trigger pulse SYNC C, whose duration is determined by timing components resistor R13, potentiometer P1 and capacitor C4. The power delivered by the switch devices to the load is proportional to the duration of the MAIN signal. Increasing the duration of the MAIN signal E by increasing the value of potentiometer P1 will proportionally increase the power delivered by the circuit to the load, up to a maximum of roughly 95% of full power, full power being measured with no power saving circuit in place.

Timing network R13, P1, and C4 is a power regulating circuit referenced to the AC signal at bridge rectifier BR1 which compensates for any fluctuations in the AC line level so as to maintain a constant electrical power delivered to the load. For example, if the duration of MAIN signal E was set to deliver a fixed power level to the load, and the line voltage dropped because of some external fault, the voltage output at BR1 would proportionally drop, and the time to charge capacitor C4 would increase. The MAIN signal E would then increase in duration, providing a longer connection of the load to the line, whose voltage had been reduced, resulting in a nearly constant power delivered to the load. Similarly, if the line voltage were to increase, the voltage at BR1 would increase, causing C4 to be charged faster. The MAIN signal E would then decrease in duration, providing a reduced connection of the load to the line, whose voltage had been increased. Thus, a constant load power is maintained under fluctuating line conditions.

Transistor Q5 and resistor R5 produce pulse RESET D, which is an inverted version of the SYNC C pulse. The network formed by C6, R10, and D9 derives the negative-going edge of this pulse and activates the reset line of the Main Timer IC1. This ensures that the Main Timer Pulse E does not extend beyond the duration of one half-cycle of the AC line.

Transistor Q10, diodes D14 and D15, resistors R29, R30 and R31, and capacitor C19 form another timing network. This network has been provided for loads such as fluorescent lamps, which require a "warm-up" period before efficient operation is achieved, to allow start-up at nearly 100% of full power level, and drop-down to the preset, reduced power level after the delay period. Capacitor C19 is initially discharged, but charges slowly through R30 and R31 until it reaches the supply voltage of 12 V DC after 15 to 20 seconds. Use is made of the modulation input of Main Timer IC1. This input (pin 5) allows the timing duration to be modified by the application of a bias current or voltage. Initially, Q10 conducts through the action of D14, R30 and C19. This causes a current to be applied through R29 to pin 5 of Main Timer IC1. This current increases the duration of MAIN signal E almost to the end of the half-cycle for as long as Q10 conducts, causing the load to receive almost full power during the delay or "warm-up" period. As C19 charges, Q10 is slowly cut off, so that after the delay period, the timing is set solely by R13, P1 and C4. Capacitor C5 is used to stabilize the modulation input.

The MAIN signal E is conducted to the drive circuits through R11 and opto-coupler light-emitting diodes OPTO 1a and OPTO 2a. These signals are received by light-sensitive phototransistors OPTO 1b and OPTO 2b shown in FIG. 8a.

Referring now to FIG. 8a, the high voltage power and drive circuitry comprises main switch circuitry 91 and Back-EMF suppressor circuitry 92. Transformer secondaries T1a and T1b together with bridge rectifiers BR2 and BR3, capacitors C12 and C15, and integrated circuits IC5 and IC6 form isolated 12 V DC regulated power supplies used to power main switch circuitry 91 and Back-EMF Suppressor circuitry 92.

Considering main switch circuitry 91 first, the MAIN signal E is conducted from LED OPTO 1a of Control Circuit 90 to phototransistor OPTO 1b and resistor R24 which send an inverted version of signal E to Main Drive IC2. This device provides Schmitt Trigger action to suppress interference signals as well as providing up to 200 mA to drive to the capacitive gate of the FET switches Q1 and Q2. Resistor R25 and capacitors C17 and C18 are for stability. Main Drive IC2 inverts the signal again, producing a pulse F identical to pulse E which drives the gates of FET switches Q1 and Q2. Resistors R26 and R27 limit the gate current at switching and zener diodes D1 and D2 are used as transient suppressors to protect the sensitive gates of FET switches Q1 and Q2. FETs are chosen for the ease of drive circuitry, ease of paralleling for higher current, and low on-resistance for low power dissipation. Although two transistors in parallel are shown, any number of devices may be used in parallel in this way to increase current ratings.

The power FETs Q1 and Q2 are protected from high transient pulses by varistor V1 and snubber network R28 and C8. The FETs Q1 and Q2 are used on the DC side of bridge rectifier BR4 in the configuration shown in FIG. 1, in order that they may conduct for both positive and negative halves of the AC cycle. Alternatively, the configuration of FIG. 2 or FIG. 3 could be utilized instead of the one shown in FIG. 1 (in which case a second drive device would have to be included in the circuit, as shown in FIG. 6), although the configuration of FIG. 1 is preferred because it requires only one floating drive circuit.

Inductors L1a and L1b and capacitor C9 form a radio frequency interference (RF1) filter which suppresses the transient voltage pulses which result from rapidly switching on and off the power devices Q1 and Q2. This network effectively isolates the power saving circuit from other loads on the same AC line. L1 consists of two bifilar windings a and b on a low permeability, high-frequency, ferrite toroidal core. C9 is an AC rated capacitor.

Main switch circuitry 91 described above is sufficient to control the power output to a resistive or incandescent load connected to an AC source. However, in order to control inductive or fluorescent loads, the additional suppressor circuitry 92 shown in FIG. 8a is required, because large transient voltages are generated across the switching devices and the load, when switching inductive loads. These voltages generate interference signals which disturb other equipment, and which are potentially destructive to the switch devices and the load. In AC circuits, a "flyback" diode cannot be used across the load as it would represent a short-circuit during each alternate half-cycle of the AC line. The solution of this problem requires a controlled short circuit across the load immediately following the turn off of the main switch device. The energy stored in the load then circulates as current, producing useful work in the load, and does not produce a damaging high voltage pulse. FET device Q3 on the DC side of bridge rectifier BR5 provides this short circuit path across the LOAD and NEUTRAL terminals. This circuit acts to suppress the back-EMF at switching. It is desirable to activate suppressor circuitry 92 at the point when the load voltage crosses zero volts but before it builds up an appreciable negative potential as shown by the dashed line on LOAD voltage G in FIG. 9. Several alternative ways of triggering this circuit are feasible. The suppressor could be activated whenever the Main Drive signal is not applied. This would create a potential short-circuit of the LINE to NEUTRAL if either of the transistors Q1 or Q3 was slow to turn off. A short time delay may be inserted between the end of the MAIN signal E and the beginning of the Suppressor Drive signal H. This delay would allow Q1 and Q2 to turn fully off before the application of a drive signal to Q3. If, however, the delay time is too long, or drifts after it has been set, the load voltage may be allowed to switch to a dangerously high level of opposite polarity. This alternative then, does not allow for load or timing variations. The slope of the load voltage waveform G may be sensed, as the turn-off portion of the waveform is steepest. However, the voltage across the load at the application of the suppressor is left uncontrolled. For these reasons, voltage level sensing is preferred as a means of feedback control for the suppressor, allowing the timing to be varied automatically to suit the load characteristics.

The voltage divider formed by R14 and R15 senses the rectified voltage level across the load. When the potential at the junction of R14, R5 and D14 drops below roughly 10 V, Q9 and Q8 turn on causing a trigger pulse through R18, C11, R19 and D13. This triggers Suppressor Driver/Timer IC3 which is configured in the same way as IC1. Driver/Timer IC3 produces a square-wave Suppressor Drive Signal H whose duration is determined by timing network R20 and C13, and reset source OPTO 2b and R22. OPTO 2b is a photo-sensitive device which detects the MAIN signal E and produces a disable signal J which disables the operation of IC3. In this way, the Suppressor Drive signal H from IC3 cannot overlap with the Main Drive signal F. The Suppressor Drive signal H is supplied to the gate of FET switch Q3 through a current-limiting resistor R21, with the sensitive gate protected from transient voltages by zener diode D3.

While one MOSFET device Q3 is shown on the DC side of bridge rectifier BR5, several transistors connected in parallel as shown in the Main Drive circuit may be used. In order to delay the voltage transient caused at switch-off of the main devices, to allow a small delay before the Suppressor Driver/Timer IC3 is activated, a capacitor C10 is added in parallel with the load. This capacitor stores energy during the initial part of the cycle when the Main Drive signal F is present and the line voltage is supplied to the load. When the Main Drive signal F is removed, the line voltage is disconnected and line current K ceases to flow. The load current L is momentarily provided by the capacitor C10 which discharges over a brief period until the voltage drops sufficiently to trigger the Suppressor Driver/Timer IC3. At this point, switch Q3 is activated and the load is short-circuited until the beginning of the next MAIN signal. The load current L is then maintained smoothly by the suppressor current M, with no harmful transients at turn-off.

The resulting load current occurs in the initial part of the half-cycle, thus presenting an apparent low, capacitive, power factor to the line. This tends to balance any low inductive, power factor loads in the installation to bring the overall power factor closer to unity. If power factor correction is not desired, the embodiment of FIGS. 6 and 7 may be used.

While the present invention has been described with reference to various preferred and alternative embodiments, it is to be understood that these embodiments are illustrative only, and that the present invention is not limited thereto, but includes all embodiments within the scope and spirit of the appended claims.

We claim:

1. A power control circuit for an AC supply circuit for supplying AC current of a predetermined frequency to a load, comprising:

a bilateral power control switch for connection in series with the load, and having a drive circuit operatively connected to the power control switch for controlling the opening and closing of the power control switch;

a timer operatively connected to the drive circuit for the power control switch for successively closing and opening the power control switch once during each half cycle of the AC supply voltage;

a bilateral load energy return circuit operating generally in synchronism with the power control switch but open when the power control switch is closed and vice versa, for returning load energy to the load immediately following opening of the power control switch;

said load energy return circuit operating under the control of the timer to provide a closed circuit across the load and to block flow of current in a reverse sense through the power control switch when the power control switch is open;

said timer operating said load energy return circuit to inhibit said load energy return circuit when the power control switch is closed.

2. A power control circuit as defined in claim 1, wherein the load energy return circuit is rendered conductive following the of the power control switch in response to a zero voltage cross-over of the load voltage.

3. A power control circuit as defined in claim 1, wherein the load energy return circuit closes, following a slight delay relative to the opening of the power control switch.

4. A power control circuit as defined in claim 3, wherein the load energy return circuit comprises a field effect transistor, and additionally comprising a drive circuit for the bilateral power control switch, said drive circuit connected to an driven by the timer and supplying a drive control voltage to the gate of the field effect transistor in response to the timer thereby to control the opening of the load energy return circuit.

5. A power control circuit as defined in claim 4, wherein the power control circuit comprises a field effect transistor and is provided with a drive circuit therefor connected to and operating the gate of the last-mentioned field effect transistor and also connected to and operated by the timer.

* * * * *